Patented July 10, 1951

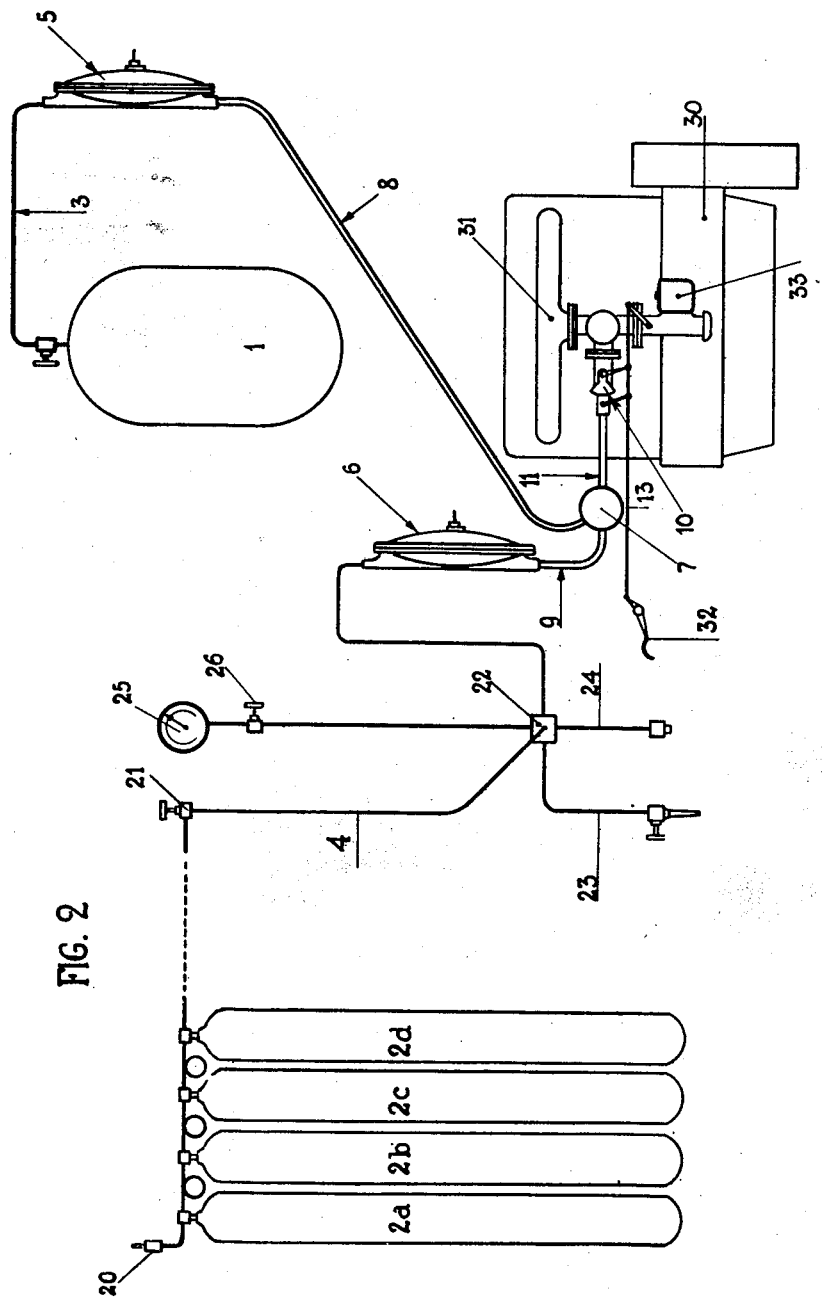

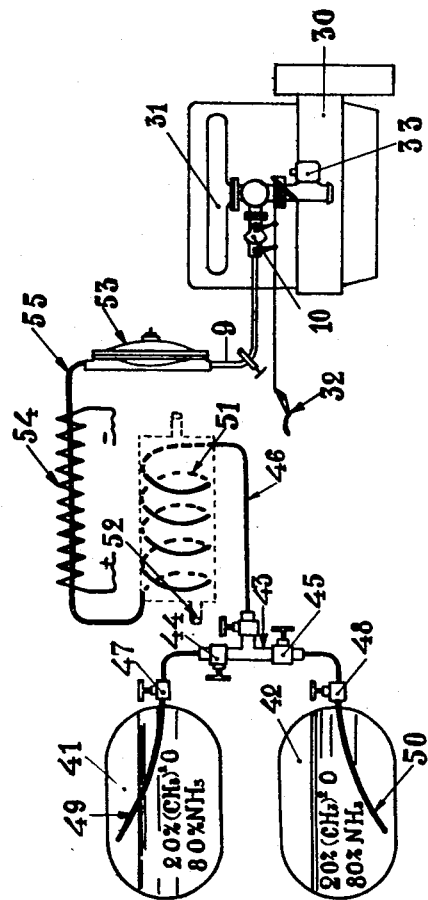

2,559,605

UNITED STATES PATENT OFFICE 2,559,605

FUEL MIXTURE FOR INTERNAL-COMBUSTION ENGINES

Eugene Justin Drouilly, Paris, France; vested in the Attorney General of the United States Application June 6, 1945, Serial No. 597,948
In France January 23, 1941

Section 1, Public Law 690, August 8, 1946
Patent expires January 23, 1961

1 Claim. (Cl. 48—197)

The present invention relates to fuels for various uses and particularly, but not exclusively, fuels intended to be fed to internal combustion engines.

An object of the invention is to permit of realizing for this purpose bodies of high calorific power but which were not used practically up to the present time for various reasons and in particular in view of their vapour tension being too high or too low.

For this purpose, according to the invention, I mix the bodies in question with products which are more or less volatile and soluble in said bodies, so as to bring the vapour tension of the whole to a value ranging within admissible limits.

A particular object of the invention, concerning the feed of internal combustion engines, is to permit of using, as fuel for said engines, ammonia which, alone, does not form with air an explosive mixture.

According to the invention, the utilization of these gases is made possible by the addition of an auxiliary gas, of a density higher than 0.1, capable of forming with air an explosive mixture producing the rise of temperature necessary for priming and starting the explosion of the mixture of air and the first mentioned gas. Preferably, this addition of auxiliary gas is effected in such manner that the volumetric calorific power of the mixture of the gases remains constant under all circumstances.

According to another characteristic of the invention, which may be applied separately, the two gases above mentioned are first mixed together in constant proportions, the addition of the air necessary for the explosion of the whole being effected only after these gases have been mixed together.

Among the auxiliary gases which can be used for priming the explosion of a mixture of air and ammonia (or an analogous gas which by itself does not produce an explosive mixture with air) I may cite other gases taken separately, such as a hydrocarbon, carbon monoxide, methyl ether, ethyl ether, a methyl amine or ethyl amine, etc., or a mixture of these gases, or again a mixture of the gases in question with inert gases such as obtained in the manufacture of illuminating gas, producer gas, coke oven gas, water gas, etc.

In particular, it has been found that it is advantageous to utilize, as auxiliary gas, a gas which has been subjected to a treatment capable of increasing its calorific power. Among these treatments, one of the most interesting is the method of ethanizing gases or mixtures of gases described in the French patent application filed September 6, 1940, for "Method of Enriching Gases in View of Their Use in Motors" by the "Centre National de la Recherche Scientifique," or the method of methanizing gases or mixtures of gases described in the French patent application filed August 23, 1941, for "Method for Eliminating Carbon Monoxide From Gases Intended Both for the Feed of Engines and for Domestic or Industrial Uses," by the same applicant.

For the sake of clarity, in the following description, I will designate by the generic word "gas" either a pure gas or a mixture of gases and it should be well understood that the word gas applies both to permanent gases and to the vapours of bodies which, at ordinary temperature, are not in the gaseous state.

It should be noted that the method according to the present invention is particularly interesting in view of the fact that it makes it possible to use, as fuels, gases which, up to the present time, could not be used for feeding internal combustion engines. In particular, my invention permits of employing ammonia gas, which can be produced in great amounts without involving the consumption of matters, such as coal, necessary for other uses and which enter into the manufacture of the other gases which have been considered as possible fuels up to the present time. Ammonia can be stored up in the liquid state in compressed gas bottles in very advantageous conditions concerning the total weight to be transported including said ammonia and its container.

Among the auxiliary bodies which are particularly advantageous to employ I can cite gaseous or highly volatile derivatives of methyl alcohol soluble in liquefied ammonia and having therefore the advantage that they can be stored therewith, in the state of mixtures of given compositions, in the same bottles.

The starting material, to wit methyl alcohol, has the advantage of being already manufactured (or being liable to be manufactured) at low cost and in unlimited amounts, in the same manufactures as ammonia itself.

Among the derivatives of methyl alcohol which comply with the above conditions, I will cite by way of example and as being particularly advantageous:

1. Methyl ether which can be easily obtained, with excellent yields, by catalytically dehydrating methyl alcohol according to well known methods.

2. Mono- and di-methyl amines (either pure or in mixture) which can be prepared in known manners from methyl alcohol and ammonia, but which can also, when this will seem advantageous, be obtained in another way, for instance through the action of halogens on acetamide or by extraction from fermentation products.

These auxiliary bodies are, in the liquid state, soluble in liquid ammonia. Their characteristics, compared with those of ammonia, are the following:

|  | Ammonia | methyl ether | monomethylamine | dimethylamine |
|---|---|---|---|---|
| Boiling points........degrees.. | −38.5 | −23.7 | −6 | 7 |
| Lower calorific power (in cal. per Kg.) | 4,490 | 6,810 | 8,280 | 9,460 |
| Temperature of explosion of the explosive mixture....°C.. | 1,728 | 1,969 | 1,970 | 2,016 |
| Pressure increased coefficient upon explosion of the mixture. | 7.68 | 8.71 | 8.35 | 8.70 |

The three products above considered by way of example in view of their explosive temperature and of their power (characterized by the increase of pressure resulting from explosion), considerably higher than those of ammonia, will render said ammonia capable of exploding when they are mixed therewith in suitable proportions (close to 20%). Furthermore, and for the same reasons, the power of the engine will be improved, the more so as these bodies have antidetonating properties.

In the case of methyl ether, as its volatility is close to that of ammonia, it will be possible to obtain, if so desired, the proper gaseous mixture by merely expanding the gas present above the liquid mixture in the bottles. In the case of mono- and di-methyl amines, it is preferable to expand the liquid itself in an evaporator, so as to obtain a gaseous mixture of constant composition.

On the other hand, it should be well understood that the invention applies, in a general manner, that is to say as well in the case of gases mixable together in the liquid form, which is for instance that of the dissolution of a liquefied gas in liquefied ammonia, as in the case where the gases (or at least one of them) are not liquefied but merely stored together in a common container, for instance in the case of the dissolution of one of the gases (in the gaseous state) in the other gas, in the liquid state.

I may also advantageously use, as addition to ammonia, ethyl ether and ethyl amine or a mixture of these bodies.

The invention therefore bears particularly, as new industrial product, on a fuel constituted by a mixture of ammonia and a gaseous or highly volatile derivative of methyl alcohol or ethyl alcohol, soluble in ammonia, such in particular as methyl or ethyl ether, mono- or di-methyl amine or an ethyl amine or a mixture of these bodies, the fuel constituted by ammonia mixed with one or several of these additional bodies being then capable of forming with air an explosive mixture.

As above stated, the invention relates in a general manner to any mixture of a gas which cannot be used alone, because its vapour tension is too high or too low, with a volatile product soluble in this gas and giving the whole a vapour tension ranging within limits as can be admitted in practice.

By way of example, I will cite ethane in admixture with a suitable amount of petroleum ether, methyl alcohol, methyl or ethyl ether, acetone, methyl acetal, methyl or ethyl formiate or acetate, etc., or a mixture of these bodies.

Methyl ether can further be used, according to the invention, as a solvent for dissolving ethane in ammonia, which permits of storing the three gases in the liquefied state in the same bottle and of using a single pressure reducing device.

I may also use methyl ether for replacing propane with or without admixture of ethane. But, for the replacement of butane, it may be advisable, if the surrounding temperature is high, and according to the feature above mentioned, to mix it with less volatile products and in particular, ethyl ether, methyl alcohol, acetone, benzine, petroleum ether, etc., or any mixture of these bodies.

By way of indication, I will give in the following tables the calorific powers and the flame temperatures of these various products:

|  | Lower calorific power (per Kg) | Flame temperatures |
|---|---|---|
|  |  | Degrees |
| Butane | 10,980 cal. per Kg | 1,958 |
| Ammonia | 4,490 cal. per Kg | 1,728 |
| Ethane | 11,400 cal. per Kg | 1,940 |
| Methyl ether | 6,810 cal. per Kg | 1,969 |
| Methane | 8,500 cal. per m³ | 1,892 |
| Hydrogen | 2,600 cal. per m³ | 2,009 |
| Carbon monoxide | 3,044 cal. per m³ | 2,104 |
| Acetylene | {13,500 cal. per m³ / 11,010 cal. per Kg} | 2,331 |

When a mixture of bodies such as above described is formed in a container, in order to avoid concentration of the most volatile product, it is advantageous, according to the invention, to collect from the container the mixture in the liquid state and to convey it in this state, either to the heating apparatus or to a volatilizing device.

In order to obtain a mixture of the main and auxiliary gases having a constant volumetric calorific power, whatever be the conditions under which it is used, these two gases should be mixed together, in constant proportions, without the variations of outflow of the mixture having any influence on said proportions.

For practical purposes, this result will be preferably obtained in the following manner:

I make use, for instance, of two sources of gas, constituted in actual practice by two bottles in which the two respective gases are stored up under pressure. Of course, one of these gases or even both of them can be in the liquid state, in said bottles. In this case, the gases evaporate at a pressure corresponding to the tension of saturated vapour of the liquid at the temperature that is considered and therefore constitute the sources of gas under pressure above referred to.

The gases under pressure are separately expanded in such manner as to be brought down both to the same pressure. I can then easily obtain the mixing of the two gases in constant proportions by admitting into a mixing chamber volumes of expanded gases corresponding to the desired proportions. In particular, it suffices suitably to choose the sections of the conduits connecting the pressure reducing apparatus with the mixing chamber for obtaining the desired result.

Once the mixture of the gases in desired proportions has been obtained, I send this mixture to a gas carburetter which incorporates thereto the amount of air necessary for the explosion of the whole.

As above stated, when the two gases can be obtained in the liquid state under acceptable conditions of temperature and pressure and when the liquids in question are mixable together, I may, according to the invention, place the two liquefied gases in a common container, the respective amounts of liquefied gases being measured in accordance with the desired proportions of gases to be obtained. But, in order that the vapours which are produced in the contained by the operation of the mixture of liquids may contain constant proportions of the two gases, they are caused to leave the bottle through a tube dipping into the liquid so as to extract from the bottle a liquid the evaporation of which is subsequently produced so as to obtain a mixture of gases in proportions corresponding to the proportions of the liquid components of the mixture in the bottle. In this case, a single pressure reducing apparatus can be employed.

The invention is also concerned with an apparatus for the feed of gaseous fuels to explosion engines.

Other features of the present invention will result from the following detailed description of some specific embodiments thereof.

A preferred embodiment of the present invention will be hereinafter described with reference to the accompanying drawings given merely by way of example and in which:

Fig. 2 is a diagram showing the plant as fitted on an automobile vehicle;

Fig. 3 is a diagrammatical view of a modification.

Figure 1:
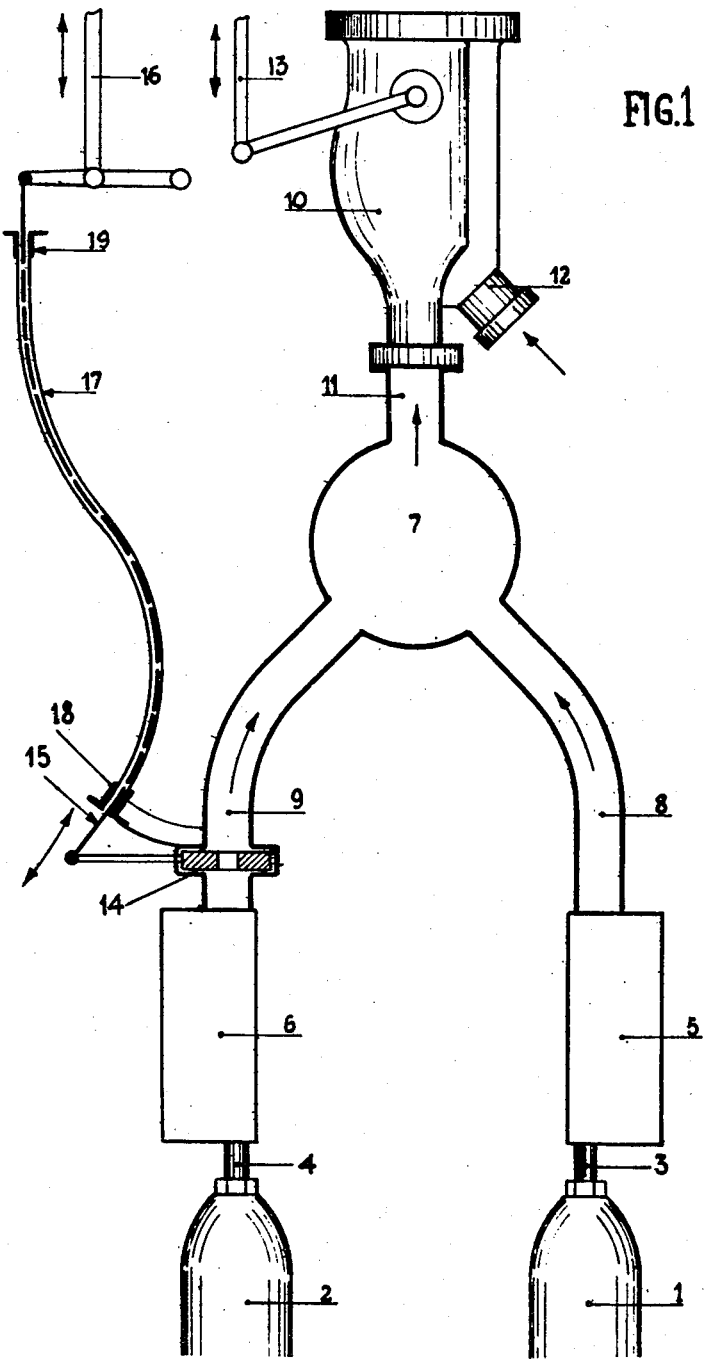
Fig. 1 is a diagrammatical view, partly in section and partly in elevation, of an apparatus made according to the invention.

In these drawings, I have shown at 1 a bottle containing liquid ammonia and at 2 a bottle containing a suitable auxiliary gas which will be supposed, for instance, to be ethanized illuminating gas. These two bottles are connected, through conduits 3 and 4, to pressure reducing apparatus 5 and 6 respectively.

The ammonia gas which escapes from bottle 1 is at a constant pressure (corresponding to the vapour tension of liquefied ammonia) as long as liquid ammonia remains in this bottle. The pressure reducing apparatus 5 is therefore intended to bring down the pressure of this gas from this fixed value to a given value.

On the contrary, in bottle 2, the gas pressure decreases as the bottle is emptying. The pressure reducing apparatus 6 therefore brings the pressure of the gas escaping from bottle 2 from a value which decreases for instance from 30 to 1 kilogram, or from 200 to 1 kilogram (according to the initial value of the pressure in the bottle) down to a predetermined value equal to the low pressure supplied by the pressure reducing apparatus 5.

The expanded gases coming from apparatus 5 and 6 are fed to a mixing chamber 7 through conduits 8 and 9, the responsive cross sections of which correspond to the ratio of the volumes of the gases to be mixed together in chamber 7. It will be understood that, as the gases supplied respectively by pressure reducing apparatus 5 and 6 are at the same pressure, the amounts of gases which are mixed together in chamber 7 are proportional to the sections of conduits 8 and 9.

I thus obtain in chamber 7 a mixture of gases the volumetric calorific power of which is constant, whatever be the rate of flow from said chamber.

This mixture is then fed to the gas carburetter 10 through pipe 11. I have shown at 12 the air inlet of this carburetter and at 13 the means for controlling the throttle valve thereof.

The operation of this device results sufficiently clearly from the preceding description for making it unnecessary to enter into supplementary explanations.

Preferably, the pressure reducing apparatus are adjusted in such manner as to bring the pressure of the gases down to a volume slightly lower than atmospheric pressure. Therefore, when the carburetter throttle is closed and there is no draft capable of sucking the gases out from chamber 7 (which corresponds to the stopping of the engine), the gas reducing apparatus do not supply any gas at low pressure and the compressed gas bottles are closed by the control valves of these apparatus.

In devices of the type above described with reference to the drawings, it seems that bottle 1 will practically always contain ammonia.

On the contrary, bottle 2 may contain any of the auxiliary gases above mentioned, or even other gases which have not been cited since the enumeration that has been given has but an indicative value and no limitative character.

It will be found that in this case, as the various gases that can be employed in bottle 2 have different calorific powers, it will be advantageous to modify the section of flow through pipe 9 according to the nature of these gases. For this purpose, I therefore provide, on this pipe, means for varying the section thereof, for instance a diaphragm 14 controlled in any suitable manner, for example by a flexible cable 15 operated through a control 16 and extending in a flexible sheath 17 fixed at its ends at 18 and 19, or more simply by an adjusting screw.

Every time the nature of the gas contained in bottle 2 is changed, the adjustment of diaphragm 14 is therefore to be modified through this control piece 16 (or through the screw), so that this adjustment corresponds exactly to the properties of the particular gases employed.

Fig. 2 shows by way of example, the diagram of a feed system employing ammonia and a compressed gas (constituting the auxiliary gas above mentioned) as used in connection with an automobile vehicle.

I have shown at 2a, 2b, 2c and 2d bottles containing the compressed gas in question, at 20 the inlet valve, at 21 the stop valve for the circuit of the gases coming from said bottle. 22 is a distributing device for connecting pipe 4 either with pressure reducing apparatus 6 or with one or the other of the feed conduits 23 and 24, which permits of charging the bottles either in a quick manner or in the normal manner. A pressure gauge 25 is also permanently connected to the distributing device with the interposition of a cock 26. Bottle 1 is also connected through conduit 3 with the pressure reducing apparatus 5. The two pressure reducing apparatus 5 and 6 open, respectively, through pipes 8 and 9, into the mixing chamber 7 as above described. The gas carburetter 10 is fed with gaseous mixture from this chamber through conduit 11 and supplies the explosive mixture to engine 30, the intake manifold of which is shown at 31 and the throttle pedal at 32.

I may, in the usual manner, provide a gasoline carburetter 33 which can be substituted in any suitable manner to the gas carburetter, for instance by means of a three-way cock operated from the instrument board of the vehicle and which permits of running either on gasoline or on the gaseous mixture.

Taking as example the case of a fuel constituted by a mixture of ammonia and one of the products above described (for instance methyl ether), mixable in the liquid state with ammonia for giving a fuel vapour capable of forming with air an explosive mixture, I will preferably employ a device such as that shown by Fig. 3.

This device includes, on the vehicle, two horizontal bottles 41 and 42, symmetrical with respect to T-piece union 43. This union piece 43 is fitted, on each branch thereof, with a cock 44—45, so as to permit of successively bringing each of the two bottles (which are kept under pressure by the vapour tension of the products stored therein into communication with the common outlet pipe 46.

This permits in particular, and without stopping the engine, of successively connecting with pipe 46 the filled bottles which may be kept in reserve and which will come to replace the bottles in which the liquid and then the gas is exhausted.

Furthermore, cocks 47 and 48, mounted on the bottles, are fitted with tubes 49 and 50 extending into the bottles to a short distance from the wall thereof. The end of one of these tubes, to wit 50, is turned downwardly in one of the bottles, to wit 42 and, therefore, dips in the liquid, while the end of the other tube, 49, is turned upwardly and therefore opens into the vapour present in bottle 41.

Under normal working conditions, the engine will be fed from the first bottle, to wit 42, which permits of sending the mixture in the liquid state into outlet pipe 46. This pipe is connected with a coil tube 51, heated by the exhaust gases issuing from exhaust pipe 52 and finally leads to pressure reducing apparatus 53, into which the fuel is fed in the state of a hot vapour, which avoids any risk of condensation.

In order to permit of starting under cold weather conditions and to make it possible to wait until the exhaust pipe is sufficiently hot for heating the liquid, so as to compensate for the cold resulting from its evaporation and the expansion of its vapour, a rectilinear portion 55 of the outlet pipe is electrically heated by a resistance 54 (the consumption of which will be for instance 100 watts, that is to say substantially that of the vehicle headlight).

Furthermore, in order to facilitate starting under very cold conditions, I may make use in the bottles of a mixture containing ammonia, methyl ether and ethane dissolved by means of said methyl ether. In this case, starting of the engine will be obtained by sending into said engine vapour obtained from the second bottle (41), this vapour being somewhat richer in hydrocarbons than the liquid mixture and permitting instantaneous starting; the electric current consumption will be the most efficient as it will not have to compensate for the cold produced by the evaporation of the liquid. This consumption of electricity will be unnecessary in summer and may even become unnecessary in winter if a sufficient amount of ethane is dissolved by the methyl ether.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claim.

What I claim is:

A fuel for internal combustion engines, comprising ammonia which ensures practically the total amount of calorific energy of the fuel and additional gas belonging to the group of methyl ether and amines, this additional gas being used in a proportion of about 20% in weight, said latter gas having the following feature: A specific gravity which is higher than 0.1 with reference to air and capable of supplying by its application, the amount of heat necessary for priming the explosion of a mixture of ammonia and air.

EUGENE JUSTIN DROUILLY.

REFERENCES CITED

The following references are of record in the file of this patent:

UNITED STATES PATENTS

| Number | Name | Date |
|---|---|---|
| 1,589,885 | Howard | June 22, 1926 |
| 1,912,044 | Schmidt | May 30, 1933 |
| 2,140,254 | Zavka | Dec. 13, 1938 |
| 2,357,184 | Frejacques | Aug. 29, 1944 |
| 2,393,594 | Davis | Jan. 29, 1946 |

FOREIGN PATENTS

| Number | Country | Date |
|---|---|---|
| 226,143 | Great Britain | Jan. 1925 |
| 269,222 | Great Britain | Apr. 1927 |
| 520,011 | Germany | Mar. 1931 |